United States Patent [19]
Marzocchi

[11] 3,773,607
[45] Nov. 20, 1973

[54] GLASS FIBER REINFORCED ELASTOMERS

[75] Inventor: Alfred Marzocchi, Cumberland, R.I.

[73] Assignee: Owens-Corning Fiberglas Corporation, Toledo, Ohio

[22] Filed: June 17, 1971

[21] Appl. No.: 154,097

[52] U.S. Cl. ................ 161/176, 117/72, 117/76 T, 117/126 GN, 117/126 GS, 161/193, 260/448.2, 260/46.5 E
[51] Int. Cl. ....................... B32b 17/04, C03c 25/02
[58] Field of Search ........................... 161/176, 193; 117/126 GN, 126 GS, 72, 76 T; 260/448.2

[56] References Cited
UNITED STATES PATENTS

| | | | |
|---|---|---|---|
| 3,589,931 | 6/1971 | Marzocchi et al. | 117/126 GN |
| 2,974,062 | 3/1961 | Collier | 117/126 GN |
| 3,252,278 | 5/1966 | Marzocchi et al. | 117/126 GN |
| 3,252,825 | 5/1966 | Marzocchi et al. | 117/126 GN |
| 3,391,052 | 7/1968 | Marzocchi | 161/176 |

Primary Examiner—George F. Lesmes
Assistant Examiner—M. E. McCamish
Attorney—Carl G. Staelin et al.

[57] ABSTRACT

This invention is addressed to the improvement in the bonding relationship of glass fibers with elastomeric materials in the manufacture of glass fiber reinforced elastomeric products wherein glass fibers are individually coated, or bundles of glass fibers are impregnated, with a composition containing an improved anchoring agent in the form of a silyl amide.

19 Claims, 4 Drawing Figures

Patented Nov. 20, 1973 3,773,607

INVENTOR.
Alfred Marzocchi
BY Staelin and Overman

GLASS FIBER REINFORCED ELASTOMERS

This invention relates to elastomeric products reinforced or otherwise combined with glass fibers and it relates more particularly to the method and compositions employed in the treatment of the glass fibers to enhance the bonding relationship between the glass fibers and the elastomeric material for making fuller utilization of the desirable characteristics of the glass fibers in their combination with the elastomeric materials.

The term "glass fibers", as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combination of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene co-polymer, butadiene-acrylonitrile co-polymer, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from three to 20 carbon atoms, such as propylene, and a polyene, such as dicyclopentadiene, 1,4-hexadiene and preferably an alkylene or alkylidene norbornene, such as 4-alkylidene-2-norbornene and the like in which the alkylidene group members from two to 12 carbon atoms.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life wearability and service characteristics in rubber tire, and as a reinforcement and the like in other electromeric coated fabrics and a molded elastomeric product.

It is an object of this invention to provide a new and improved composition which may be used as a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in conbination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which.

Until recently, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

The concepts of the present invention reside in a new and improved anchoring agent in the form of a silyl amide or polyamide which may be formulated into size and/or impregnant compositions which are applied to glass fibers in order to enhance the bonding relationship between the treated glass fibers and elastomeric materials in the manufacture of glass fiber reinforced elastomeric products.

The invention will be described with reference to a new and improved composition which can be employed as an original size applied to glass fibers in forming to thereby individually coat each of the glass fiber filaments subsequently formed into strands, yarns, cords or fabrics, hereinafter referred to as bundles, to provide both the desired processing and performance characteristics and enhance the bonding relationship when the sized glass fibers are combined with elastomeric materials in the manufacture of glass fiber reinforced elastomeric products.

In another embodiment of this invention, the composition is formulated as an impregnating composition for treatment of strands, yarns, cords and fabrics formed of previously sized glass fibers for penetration of the treating composition into the strand, yarn, cord or fabric with the invention of individually coating the fibers to protect the fibers against destruction by mutual abrasion while establishing a bonded relationship therewith or else penetrating the glass fiber strand, yarn, cord or fabric sufficiently to intertie the glass fiber system with the elastomeric materials with which the glass fibers are combined in the manufacture of glass fiber-elastomeric products.

In accordance with one concept of the invention, the silyl amide anchoring agents are prepared by reacting an organo silicon compound containing at least one organic group bonded to the silicon atom which is substituted by at least one amino group with an organic carboxylic acid or polycarboxylic acid.

As the organo silicon compound, use is preferably made of organo silanes having one to three highly hydrolyzable groups, such as alkoxy containing one to six carbon atoms (e.g., methoxy, ethoxy, propoxy, etc.) or halogen, preferably chlorine or bromine, and at least one organic group attached to the silicon atom containing up to 12 carbon atoms and substituted by at least one amino group, with any remaining valences on the silicon atom being taken up by hydrogen atoms.

Preferred amino silanes are those having the formula $$(H_2N-R_1-)_n Si(R_2)_m Z_{(4-n-m)} \quad (I)$$

wherein $R_1$ is a divalent organic radical containing up to 12 carbon atoms, $R_2$ is a monovalent organic radical or hydrogen, Z is a highly hydrolyzable group (e.g., alkoxy or halogen as described above), n is an integer of 1 to 3, and m is zero or an integer of 1 to 2.

Representative of the $R_1$ groups which can be employed in the practice of this invention include alkylene groups containing two to eight carbon atoms (e.g., dimethylene, trimethylene, tetramethylene, hexamethylene, etc.), alkenylene containing two to six carbon atoms (e.g., ethenylene, propenylene, etc.), arylene and preferably phenylene or cycloalkylene containing five to eight carbon atoms (e.g., cyclopentylene, cyclohexylene, etc.).

In addition, $R_1$ can also be derived from the polyalkylene amine groups and thus have one of the following formula $$\pm(CH_2)_x NH \pm_a (CH_2)_y - \quad (II)$$

wherein x and y are integers from 2 to 4 and a is an integer from 1 to 3.

As indicated, $R_2$ is an organic group or hydrogen. Preferred organic groups include alkyl containing one to six carbon atoms (e.g., methyl, ethyl, isopropyl, etc.), as well as the halo-substituted derivatives thereof, and alkenyl containing two to six carbon atoms (e.g., vinyl, allyl, etc.).

Representative of the foregoing silanes include beta-aminoethyltrichloro silane, gamma-aminopropyltrimethoxy silane, delta-aminobutylvinyldiethoxy silane, bis-(aminopropyl)diethoxy silane, beta-aminovinyltrichloro silane, bis-(gamma-aminoallyl)dimethoxy silane, beta-aminovinylethyldimethoxy silane, p-aminophenyltrichloro silane, p-aminophenylallyldichloro silane, 3- aminocyclohexyldimethoxy silane, N-(aminoethyl)-aminopropyltriethoxy silane and N-[N'-(aminoethyl)-aminoethyl]-aminopropyltrimethoxy silane.

It will be understood by those skilled in the art that the silanol and siloxanes derived from the foregoing silanes may also be used in the practice of this invention, and are included with the scope of the invention. When use is made of a siloxane, it is generally preferred that the siloxane have a relatively low molecular weight, most preferably less than about 500.

It will similarly be understood that a wide variety of monocarboxylic acids or polycarboxylic acids may be employed in the practice of this invention. In general, suitable carboxylic acids include aliphatic, cycloaliphatic, and aromatic mono- and polycarboxylic acids having five to 30 carbon atoms and one to four carboxyl groups.

Particularly preferred mono-carboxylic acids are those having the formula $$R_3-\overset{O}{\underset{\parallel}{C}}-OH \quad (III)$$

wherein $R_3$ is alkyl having four to 25 carbon atoms, such as pentyl, hexyl, octyl, decyl, lauryl, stearyl, etc., alkenyl having four to 20 carbon atoms, such as iso-butenyl, n-butenyl, etc., cycloalkyl having four to eight carbon atoms, such as cyclobutyl, cyclopentyl, cyclohexyl, etc., aryl having six to 15 carbon atoms such as phenyl, naphthyl, etc., N-heterocyclic groups having five to 10 carbon atoms, such as pyridyl, quinolyl, etc., as well as the amino- and halogen-substituted derivatives of the foregoing groups as well as the corresponding acid halides, and particularly acid chlorides and anhydrides of these acids.

Representative of suitable monocarboxylic acids are acetic acid, butyric acid, heptanoic acid, decanoic acid, tridecanoic acid, myristic acid, palmitic acid, stearic acid, methacrylic acid, crotonic acid, sorbic acid, cyclobutane carboxylic acid, cyclohexane acetic acid, benzoic acid, napthoic acid, nicotinic acid, isonicotinic acid, quinaldic acid, cinchonic acid, paraaminobenzoic acid, as well as a wide variety of others. When a monocarboxylic acid is reacted with an amino silane in accordance with the concept of the present invention, it is preferred that the monocarboxylic acid be a fatty acid, that is, an acid containing nine to 20 carbon atoms.

Particularly preferred polycarboxylic acids are those having the formula

$$HO-\overset{O}{\underset{\parallel}{C}}-R_4-\overset{O}{\underset{\parallel}{C}}-OH \quad (IV)$$

wherein $R_4$ is a divalent organic radical such as alkylene having two to 20 carbon atoms, such as methylene, hexamethylene, decamethylene, etc; alkenylene having two to 20 carbon atoms such as ethenylene, propenylene, etc; cycloalkylene having four to 10 carbon atoms, such as cyclobutylene, cyclopentylene, cyclohexylene, etc; arylene having one to 20 carbon atoms, such as phenylene, naphthylene, etc. and N-heterocyclic groups. Also contemplated are the corresponding acid halides and anhydrides.

Illustrative of the acids contemplated are succinic acid, glutaric acid, adipic acid, pimelic acid, suberic acid, azelaic acid, sebacic acid, dodecanedioic acid, undecanedoioc acid, maleic acid, fumaric acid, glutaconic acid, 2-octenedioic acid, 1,3-cyclopentanedicarboxylic acid, 1,4-cyclocyclohexanedicarboxylic phthalic acid, isophthalic acid, terephthalic acid, 1,3,5-benzenetricarboxylic acid, 1,8-naphthalenedicarboxylic acid, 3,4-quinolinedicarboxylic acid, 1,2,3,4-cyclopentanetetracarboxylic acid, 1,2,3,4-benzenetetracarboxylic acid, 1,1,5-pentanetricarboxylic acid, 1,2,4-hexanetricarboxylic acid as well as a variety of others.

The reaction between the amino-substituted organo silicon compound is preferably carried out by contacting the reactants for a time sufficient to permit the reaction to occur, although the reaction is preferably accelerated by heating the reaction mixture to a temperature as high as 250°C., depending on the reactants. It is generally preferred to carry out the reaction in inert organic solvents, such as aliphatic carboxylic acid esters, petroleum ethers, benzene, toluene, xylene, etc. can be used to promote the stability of the reaction system when use is made of aqueous media. It is frequently desirable to carry out the reaction at an alkaline pH, and preferably at a pH of 10 or higher. For this purpose, the reaction can be carried out in the presence of a quaternary ammonium hydroxide in an amount sufficient to provide the desired pH.

Preferred quaternary compounds are those of the formula (V)

wherein $R_1$, $R_2$ and $R_3$ are each alkyl containing one to 20 carbon atoms or alkanolyl groups containing one to six carbon atoms, and $R_4$ is alkyl or alkanolyl is described above or benzyl. It is generally desirable to make use of those quaternary hydroxides described above which contain 22 or fewer carbon atoms.

Representative of the quaternary ammonium hydroxides which can be used in the practice of this invention include tetramethyl ammonium hydroxide, tetraethyl ammonium hydroxide, trimethylstearyl ammonium hydroxide, triethylbenzyl ammonium hydroxide, tetraethanol ammonium hydroxide, etc.

Alternatively, the reaction can be carried out under a blanket of ammonia which is dissolved in part to adjust the reaction mixture to the desired pH. This methhood is particularly advantageous in that removal of the ammonia blanket serves to release substantially all of the alkaline material from the reaction mixture on completion of the reaction.

The relative proportions of the reactants is not critical, and can be varied within wide ranges. In general, it is preferred to employ the amine and acid in such proportions that the ration of amino groups to carboxyl groups (or their equivalent in the case of acid halides or anhydrides) is within the range of 0.8 to 3, and most preferably 0.9 to 1.5.

Without limiting the present invention as to theory it is believed that the predominant product of the reaction is a silyl-containing amide which is formed by way of the following equation, using for purposes of illustration the formulas (I) and (III):

It is similarly believed that the same type of reaction occurs when use is made of a polysiloxane. For example, with a linear polysiloxane derived from a silane of formula I when $n$ is 1 and $m$ is zero, the product is believed to contain wherein $z$ is an integer which is a function of the molecular weight. As will be appreciated by those skilled in the art, where $m$ is 1, the Z group in the above are replaced by $R_2$ groups. Analogous products are formed by reaction of the acid with cyclic dimeric and trimeric polysiloxanes.

As will be appreciated by those skilled in the art, the products can have more complex structures when use is made of polycarboxylic acids. For example, the reaction can be illustrated by means of the relatively simple equation where $n = 1$. Silyl polyamides are prepared when use is made of a polyamino organo silicon compound and a polycarboxylic acid.

The foregoing are simply illustrative of the types of the reactions which occur in accordance with the practice of the invention, and should not be construed as limiting as to the nature of the silyl amides of this invention.

In accordance with another concept of this invention, silyl amide anchoring agents are prepared by reacting a carboxyl-substituted organo silane and an amine compound. As the carboxyl silane, use is preferably made of an organo silane containing one to three readily hydrolyzable groups and at least one organic group containing up to 12 carbon atoms and substituted by at least one carboxy group, with any remaining valences on the silicon atom being taken up by hydrogen. It is believed that the formation of the silyl amide occurs as a result of the reaction of the carboxy group of the silane with the amino group of the amine compound.

Particularly preferred carboxy silanes are those of the type described in U.S. Pat. No. 3,169,884, which have the following formula

(X)

wherein $p$ is an integer from 1 to 2, $R_5$ is a divalent organic radical, and preferably alkylene containing two to eight carbon atoms (e.g., dimethylene, trimethylene, tetramethylene, etc.) and Z is a readily hydrolyzable group as described above.

Representative of the foregoing silane include beta-carboxyethyltrimethoxy silane, gamma-carboxypropyltrichloro silane, beta-carboxyethyltriethoxy silane, delta-carboxybutyltrimethoxy silane, etc., as well as the corresponding silanols and polysiloxanes derived therefrom.

A wide variety of organic amines can be employed in the preparation in the silyl amides according to this concept of the invention. In general, use should be made of aliphatic and aromatic amines containing one to 20 carbon atoms.

One preferred group of amines in the practice of this invention are the diamines of th formula (XI)

wherein $R_6$ is a divalent organic radical, such as alkylene containing one to 12 carbon atoms (e.g., methylene, dimethylene, trimethylene, tetramethylene, etc.) arylene containing six to 12 carbon atoms (e.g., phenylene), cycloalkylene containing five to eight carbon atoms (e.g., cyclopentylene, cyclohexylene, etc.) or an N-heterocyclic group such as pyridylene group.

Representative of such amines include ethylene diamine, triethylene diamine, pentamethylene diamine, octamethylene diamine, 1,4-diaminobenzene, 1,6-diaminocyclohexane, 2,6-diaminopyridine, etc.

Another group of amines useful in accordance with the invention are the polyethylene imines of the formula (XII)

wherein $q$ is an integer from 1 to 8, and preferably 1 to 5. Also contemplated for use in the present invention are the lower polyalkylene polyamines, including diethylene triamine, triethylene tetraamine, tetraethylene pentamine, tripropylene tetraamine, tributylene tetraamine.

Monamines can also be used in the preparation of the silyl amides in accordance with this invention, including amines of the formula (XIII)

wherein $R_7$ is alkyl containing one to 10 carbon atoms (e.g., methyl, ethyl, isopropyl, etc.), aryl containing six to 10 carbon atoms (e.g., phenyl, benzyl, naphthyl, etc.), an N-heterocyclic group such as pyrrolyl, pyridyl, pyrimidyl, etc. or an ester group of the formula

(XIV)

wherein $R_8$ is alkyl containing one to five carbon atoms (e.g., methyl, ethyl, propyl, isobutyl, etc.) and $R_9$ is alkylene containing one to five carbon atoms or phenylene.

Illustrative of this latter group of compounds are ethylamine, isopropylamine, analine, benzylamine, cyclohexylamine, 2-aminopyrrole, 5-aminopyrimidine, aminopyridine, ethyl 3-aminopropionate, methyl 2-aminoacetate, ethyl 4-aminobenzoate, etc.

The reaction between the carboxyl silanes and the foregoing organic amines is generally carried out in the same manner described above. For best results, use should be made of the reactants in proportions sufficient to provide a mole ratio of carboxyl group to amine groups of 0.8 to 3.0, and preferably 0.9 to 1.5.

It is believed that the reaction of this concept of the invention results in the formation of the amide group through reaction of the carboxy group of the silane, silanol or siloxane with the amino group of the amine. This general reaction can be carried out in a number of ways depending on the silane, the amine and the relative proportions of each. For example, the reaction can proceed in accordance with the following and

As will be appreciated by those skilled in the art, polyamides are formed when use is made of a carboxy silicon compound and an amine compound each containing two or more functional groups.

In accordance with yet another concept of this invention, silyl amides coupling or anchoring agents are also prepared by reaction of a carboxy silane and an amino silane of the types described above. While the relative proportions are not critical, it is preferred that the carboxy silane and the amino silane be reacted in proportions to provide at least 0.5 mole of carboxy groups per mole of amino groups.

In the preferred practice of this concept of the invention, use is preferably made of an amino silane of the formula wherein $R_1$, $R_2$, Z, n and m are as described above and a carboxy silane of the formula wherein $R_5$, Z and p are as described above. The nature of the product depends upon the nature of each of the silane reactants and upon the relative proportions. Illustrative of the reactions which can be carried out include the following:

A.

B.

In the most preferred embodiment, m is zero in the foregoing equations.

As will be appreciated by those skilled in the art, where both the carboxy silane and the amino silane each contain more than one functional group, the product is a polyamide, generally having an average molecular weight less than 1,000, and preferably less than 500.

This reaction is preferably carried out at an alkaline pH as previously described. For best results, the mole ratio of carboxyl silane to amino silane can be varied within the range of 0.4 to 3.0, and preferably 0.5 to 1.5.

Having described the basic concepts of the invention, reference is now made to the following examples, which are provided by way of illustration and not by way of limitation, of the practice of the invention in the preparation and use of the anchoring agents in the treatment of glass fibers.

EXAMPLE 1

A sample of 1 mole of gamma-aminopropyltriethoxy silane is dispersed in petroleum ether. Thereafter, 1 mole of lauric acid is added, and the resulting mixture is stirred for 1 hour at 95°C.

Thereafter, the water and unreacted materials are removed, and the product, which is a thick syrupy liquid, is identified as gamma-lauroylamidopropyltriethoxy silane.

EXAMPLE 2

The procedure described in Example 1 is repeated using delta-aminobutyltrimethoxy silane and stearic acid. The product is identified as gamma-stearoylamidopropyltrimethoxy silane.

EXAMPLE 3

The procedure of Example 1 is again repeated using bis(beta-aminoethyl)dimethoxy silane and n-decanoic acid. The product is identified as bis(beta-n-decanoamidoethyl)dimethoxy silane in the form of a viscous liquid.

EXAMPLE 4

The procedure of Example 1 is again repeated using gamma-aminopropyltrimethoxy silane and isonicotinic acid. The product is a viscous liquid, and is identified as gamma-isonicotinamidopropyltrimethoxy silane.

EXAMPLE 5

The procedure of Example 1 is repeated using gamma-aminopropyldiethoxy silane and cyclohexane acetic acid to form gamma-cyclohexylacetamidopropylvinyldimethoxy silane.

EXAMPLE 6

In this example, adipic acid is reacted with beta-aminovinyldimethoxy silane in a role ratio of 2 moles of silane per mole of acid. The product is a viscous liquid identified as N,N'-bis-(dimethoxysilylvinyl)adipamide.

EXAMPLE 7

In this example, the procedure of Example 6 is repeated using delta-aminobutyltrimethoxy silane and malonic acid in a mole ratio of 2 moles of silane per mole of acid. The product is identified as N,N'-bis-(trimethoxysilylbutyl)-malonamide.

EXAMPLE 8

The procedure of Example 1 is again repeated using p-aminophenyltrichloro silane and decanoic acid in about equimolar proportions. The product is a viscous liquid, and is identified as p-decanoamidophenyltrichloro silane.

EXAMPLE 9

One mole of gamma-aminopropylallyldimethoxy silane is dispersed in water, and the reaction vessel is purged with gaseous ammonia and then maintained under an ammonia blanket at a pressure sufficient to adjust the pH of the reaction mixture to about 10.3.

One mole of crotonic acid is added and the reaction mixture is heated to a temperature of about 98°C. for about 1 hour, after which the ammonia blanket is removed and water and unreacted materials are separated. The product is identified as gamma-crotonylamidopropylallyldimethoxy silane.

EXAMPLE 10

Using the procedure described in Example 9, 3-aminocyclohexyltriethoxy silane is reacted with succinic acid in a mole ratio of 2 moles of silane per mole of acid. The product is identified as N,N'-bis-(triethoxysilyl-3-hexyl)succinamide.

EXAMPLE 11

Using the procedure described in Example 1, delta-aminobutylisopropyldimethoxy silane is reacted with phthalic acid in a mole ratio of 2:1. The product is N,N'-bis(dimethoxyisopropylsilylbutyl)phthalamide.

EXAMPLE 12

Using the procedure described in Example 9, gamma-aminoallyltrimethoxy silane is reacted with 3,4-quinolinedicarboxylic acid in a mole ratio of about 2:1. The product is N,N'-bis(triethoxysilyl-gamma-allyl)-3,4-quinolinedicarboxamide.

EXAMPLE 13

Using the procedure described in Example 1, bis-(gamma-aminopropyl)dimethoxy silane is reacted with maleic acid in a mole ratio of 1.1 moles of silane. The reaction is carried out over the period of about 1.5 hours at 110°C.

After removal of unreacted materials, there is obtained a polyamide in the form of a high viscous liquid having an average molecular weight of about 830.

EXAMPLE 14

A linear polysiloxane (755 g.) having an average molecular weight of 755 formed of gamma-aminopropyltrimethoxy silane is dispersed in toluene. Thereafter, 6 moles of lauric acid are added to the mixture, and the resulting mixture heated for 2 hours at 90°C.

After removal of unreacted materials there is obtained a polyamide having an average molecular weight of 1,360.

EXAMPLE 15

The procedure of Example 14 is repeated using the polysiloxane of Example 14 and benzoyl chloride. The product is a polyamide having an average molecular weight of 1,560.

EXAMPLE 16

The procedure of Example 14 is again repeated using a polysiloxane formed from delta-aminobutyltrimethoxy silane and having an average molecular weight of 840, and malonic acid. The product is a silyl polyamide having an average molecular weight of 3,470.

EXAMPLE 17

Using the procedure described in Example 1, N-(beta-aminoethyl)-gamma-aminopropyltrimethoxy silane is reacted with lauric acid in a mole ratio of about 1:1. The product is found to include N-(beta-laurylamidoethyl)-gamma-aminopropyltrimethoxy silane.

EXAMPLE 18

The procedure of Example 17 is repeated using N-(beta-aminoethyl)-gamma-aminopropyltrimethoxy silane and succinic acid. The product is found to include bis-N,N'-(trimethoxysilylpropylaminoethyl)-succinamide.

EXAMPLE 19

Using the procedure described in Example 9, bis-(delta-aminobutyl)dimethoxy silane is reacted with fumaric acid in a mole ratio of about 1:1. The product is a viscous polyamide having an average molecular weight of 634.

EXAMPLE 20

One mole of beta-carboxyethyltrimethoxy silane is reacted with one mole of hexamethylene diamine in accordance with the procedure described in Example 1.

The reaction is carried out for 45 minutes at 80°C., and then unreacted materials are removed. The product is N-(6-aminohexyl)trimethoxysilylcarboxamide of the formula: $(CH_3O)_3$ $Si—CH_2—CH_2—CO—NH—(CH_2)_6—NH_2$ as well as a small amount of the corresponding diamide: $(CH_3O)_3$ $Si—CH_2—CH_2—CO—NH—(CH_2)_6—NH—OC—CH_2—CH_2—Si(OCH_3)_3$.

EXAMPLE 21

Using the procedure described in Example 9, 1 mole of gamma-carboxypropyltriethoxy silane is reacted with 0.5 moles of 2,6-diamino-pyridine. The product is a silyl amide of the formula

EXAMPLE 22

Using the procedure of Example 20, one mole of bis-(beta-carboxyethyl)dimethoxy silane is reacted with 1 mole of diethylene triamine. The product is a viscous low molecular weight polyamide ($\overline{MW} = 700$).

EXAMPLE 23

Using the procedure of Example 22, 1 mole of bis-carboxyethyl)dimethoxy silane is reacted with 2 moles of 2aminopyridine. The product is a polyamide of the formula

EXAMPLE 24

Using the procedure of Example 9, delta-carboxybutyltrichloro silane is reacted with benzylamine in a mole ratio of 1:1. The product is N-benzyl-trichlorosilylbutylcarboxamide.

EXAMPLE 25

Using the procedure of Example 1, 1 mole of beta-carboxyethyltrimethoxy silane is reacted with one mole of ethyl 2-aminoacetate. The product is an amide of the formula

EXAMPLE 26

Using the procedure described in Example 1, gamma-aminopropyltrimethoxy silane is reacted with beta-carboxyethyltrimethoxy silane in a mole ratio of 1:1. The product is an amide of the formula

EXAMPLE 27

The procedure of Example 26 is repeated using 2 moles of the amino silane and 1 mole of bis(beta-carboxyethyldimethoxy silane to form the amide

EXAMPLE 28

The procedure of Example 26 is again repeated with beta-carboxyethyltrimethoxy silane and bis-(gamma-aminopropyl)dimethoxy silane is a mole ratio of 1:1. The product includes a mixture of the following amides:

and

EXAMPLE 29

The procedure of Example 9 is repeated using N-(beta-aminoethyl)-gamma-aminopropyltriethoxy silane and gamma-carboxypropyltrimethoxy silane in a mole ratio of about 1:1 to prepare the following silyl amide:

The anchoring agents of this invention may be applied to glass fibers as a size in forming, or afterwards, to protect the individual glass fibers from destruction by mutual abrasion and to impart a lubricity thereto without destroying the fibrous characteristics of the fibers. One such treating composition is as follows.

EXAMPLE 30

Size Composition 0.1 – 3.0% by wt. silyl amide anchoring agent
0 – 10% by wt. quaternary ammonium hydroxide
99.9 – 87% by wt. water As indicated in Example 29, it is sometimes desirable, though frequently not necessary to formulate the aqueous solution of the anchoring agent to contain a quaternary ammonium hydroxide to promote the stability of the solution.

If desired, the silyl amide anchoring agents of this invention can be formulated in treating compositions of the type described by the prior art containing various film-forming agents and/or lubricants, such as gelatin, polyvinyl alcohol, etc. Such compositions may be illustrated by the following examples.

EXAMPLE 31

Forming Size Composition 8.0% by wt. partially dextrinized starch
1.8% by wt. hydrogenated vegetable oil
0.4% by wt. cationic wetting agent (lauryl amine acetate)
0.2% by wt. nonionic emulsifying agent
1.0% by wt. silyl amide anchoring agent
88.6% by wt. water

EXAMPLE 32

Forming Size Composition 3.2% by wt. saturated polyester resin
0.1% by wt. fatty acid amine wetting agent (Nopcogen 16 L)
0.1% by wt. polyvinyl alcohol
3.0% by wt. pyrrolidine
0.3% by wt. silyl amide anchoring ent
0.1% by wt. glacial acetic acid
93.2% by wt. water

EXAMPLE 33

Forming Size Composition 0.2% by wt. paraffin wax in aqueous emulsion
1.3% by wt. cationic amide polyester resin
2.3% by wt. polyglycol condensate (300 to 400 mw)
0.25% by wt. gelatin
0.5% by wt. silyl amide anchoring agent
0.1% by wt. dibasic ammonium phosphate
0.2% by wt. glacial acetic acid
95.15% by wt. water

EXAMPLE 34

Figure 1:
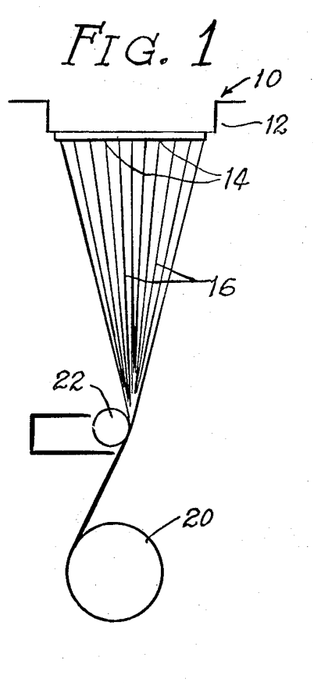
FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products.

Forming Size Composition 0.5% by wt. silyl amide anchoring agent
0.25% by wt. fatty acid amine wetting agent (Nopcogen 16 L)
99.25% by wt. water Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 30 to 34 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

Figure 3:
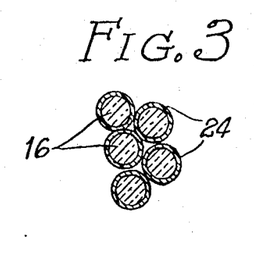
FIG. 3 is a cross-sectional view of glass fibers processed in accordance with the diagram illustrated in FIG. 1; and, FIG. 4 is a cross-sectional view of a bundle of glass fibers processed in accordance with the flow diagram of FIG. 2.
Figure 4:
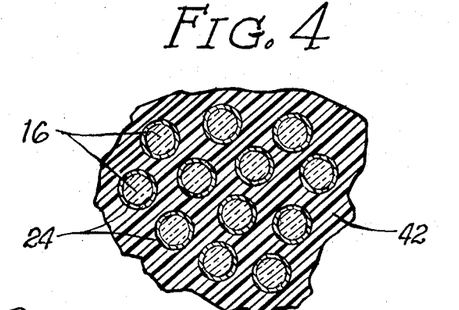

The sized strands are allowed to air dry or drying of the thin size coating can be accelerated by exposure to elevated temperature such as a temperature within the range of 150° to 250°F. The applied size forms a very thin coating 24 on the surface of the glass fibers 16 (FIG. 3) to impart a desired balance of lubricity and bonding without destroying the fibrous characteristic or appearance of the fiber.

The strand 18 of sized glass fibers can be preferably plied with other strands and twisted to form yarns, threads, or cords which may be used as a reinforcement for elastomeric materials, with or without cutting to shorten lengths, and which can be formed into woven or non-woven fabrics for subsequent combination with elastomeric materials. In addition, the strand 18 can be directly combined with elastomeric materials whereby the silyl amide anchoring agents of this invention serve to enhance the bonding relationship between the glass fiber surfaces and the elastomeric material.

Alternatively, the silyl amide anchoring agents of this invention may be formulated in impregnating compositions containing an elastomer or a resin or combinations thereof for use in the treatment of glass fibers after they have been formed into strands of a plurality of filaments, yarns, cords formed of a plurality of strands plied or assembled together in which the strands forming the cords may have a twist, a reverse twist or no twist, threads or fabrics, hereinafter referred to as bundles. One such impregnating composition is as follows.

EXAMPLE 35

Impregnating Composition

Natural rubber latex-
  resorcinol formaldehyde resin
  (38% solids) ("Lotol 5440")    10–50%
Silyl amide anchoring agent    0.1–3.0%
Water    Balance Suitable resorcinol aldehyde resins and combinations thereof with natural rubber latex are marketed by the U.S. Rubber Company under the tradename "Lotol 5440". For the preparation of such materials, reference can be made to Canadian Pat. No. 435,754 wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex.

Another such impregnating composition which may be used is disclosed in U.S. Pat. No. 3,424,608, and may be formulated as follows.

EXAMPLE 36

| | Parts by wt. |
|---|---|
| Resorcinol formaldehyde resin | 2–10 |
| Formaldehyde (37% solution) | 1–3 |
| Concentrated ammonium hydroxide | 2–5 |
| Vinyl pyridine-butadiene-styrene terpolymer | 15–50 |
| Neoprene rubber latex (50% solids) | 25–50 |
| Butadiene latex(60% solids) | 5–15 |
| Alkali metal hydroxide | .05–0.2 |

Water is incorporated with the foregoing materials in amounts to produce an impregnating composition having a minimum solids content of 10 percent and a maximum solids content of about 50 percent with a dry solids of 5–25 percent by weight of the glass fiber system and preferably 10–15 percent by weight.

Figure 2:
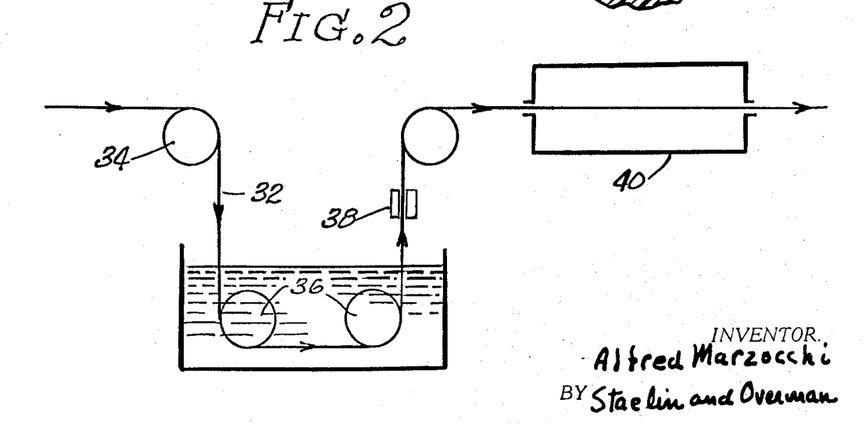
FIG. 2 is a flow diagram illustrating the treatment of glass fibers subsequent to their being formed into bundles in accordance with the preferred practice of this invention.

Impregnation with the aqueous compositions of Examples 35 and 36 can be made by conventional means for impregnation, such as by immersion of the bundles of glass fibers in a bath of aqueous impregnating composition. Referring more specifically to FIG. 2 of the drawing, the glass fiber bundle 32 is advanced over a guide roller 34 for passage downwardly into the bath 35 containing the impregnating composition of Example 35 or 36. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter, the endless bundle is advanced over the roller 39 into a drying oven preferably in the form of an air drying oven maintained at a temperature above ambient temperature and preferably at a temperature within the range of 150° to 350°F. to accelerate removal of the aqueous diluent and to set the impregnating material in situ in the glass fiber bundle. Drying will occur in a relatively short period of time, ranging from 1 to 30 minutes, depending somewhat upon the temperature of drying. Use can be made of dielectric treatment to coagulate the latex with little or no drying.

It is desirable to achieve as full impregnation as possible into the bundles of glass fibers in order to more effectively separate the fibers one from the other by the impregnating materials since the solids are effective as a coating on the sized glass fibers to cushion the fibers and to protect the fibers against mutual abrasion. Thus, it is desirable to achieve as deep penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure of vulcanization of the elastomeric material during the fabrication of the elastomeric material.

When the glass fibers are sized in forming with a composition embodying the features of this invention, the sized fibers can be processed directly into sized yarns, strands, cords or fabrics, or used alone in combination with elastomeric materials without the need for impregnation of the bundles of glass fibers since individual fibers 16 of the bundle are already provided with a coating 50 (FIG. 3) formulated to contain the desired components for anchoring the elastomeric material and for protecting the glass fibers to enhance their processing and performance characteristics.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material are processed in a conventional manner by molding or cure under heat and compression or by vulcanization for advancement of the elastomeric material to a cured or vulcanized state while in combination with the treated glass fibers whereby the glass fibers or bundles of glass fibers become strongly integrated with the elastomeric material in the glass fiber-elastomeric product.

It will be understood that the impregnating compositions, represented by Examples 35 and 36, may also be employed as size compositions, preferably with greater dilution with aqueous medium, since the anchoring agent embodied in the impregnating composition will continue to operate as an anchoring agent further to facilitate the bonding relationship or integration between the elastomeric material of the continuous phase and the treated glass fibers. It will be understood further, that the glass fiber may be impregnated in forming with a size composition represented by Examples 30 to 34, followed by impregnation of strands, yarns, cords, fabrics or bundles formed thereof with compositions of this invention represented by Examples 35 and 36.

It will be apparent that I have provided a new and improved composition for use in the treatment of glass fibers and bundles of glass fibers to enhance their integration with elastomeric materials in the manufacture of glass fiber-elastomeric products.

It will be understood that invention exists not only in the composition for use in the treatment of the glass fibers to prepare the glass fibers for combination with elastomeric materials but that invention exists also in the process in which the compositions are employed in the treatment of glass fibers as well as the treated or impregnated glass fiber products formed thereof.

It will be understood that changes may be made in the details fo formulation and methods of application or use without departing from the spirit of the invention, especially as defined in the following claims.

I claim:

1. A glass fiber bundle comprising a plurality of glass fibers and an impregnant in the bundle, said impregnant comprising an elastomer compatible material and an anchoring agent selected from the group consisting of a silyl amide formed from an organo silicon compound selected from the group consisting of an organo silane containing one to three readily hydrolyzable groups and at least one organic group containing up to 12 carbon atoms and substituted by at least one amino group, with any remaining valences on the silicon atom being taken up by hydrogen and the corresponding silanols and siloxanes and an acid compound selected from the group consisting of aliphatic, cycloaliphatic and aromatic carboxylic acids containing five to 30 carbon atoms, their anhydrides and acid halides; a silyl amide formed of an amino silane containing one to three readily hydrolyzable groups and at least one organic group containing up to 12 carbon atoms and substituted by at least one amino group with any remaining valences on the silicon atom being taken up by hydrogen and a carboxy silane containing one to three readily hydrolyzable groups and at least one organic group containing up to 12 carbon atoms and substituted by at least one carboxy group, with any remaining valences on the silicon atom being taken up by hydrogen; a silyl amide formed from a carboxy compound selected from the group consisting of an organo silane containing one to three readily hydrolyzable groups and a least one organic group containing up to 12 carbon atoms and substituted by at least one carboxy group, with any remaining valences on the silicon atom being taken up by hydrogen, and the corresponding silanols and polysiloxanes and an amine compound selected from the group consisting of aliphatic and aromatic amines containing one to 20 carbon atoms.

2. A glass fiber bundle as defined in claim 1 wherein said elastomer compatible material is selected from the group consisting of an elastomer, a resin and combinations thereof.

3. A glass fiber bundle as defined in claim 2 wherein the bundle is in the form of a cord formed of a plurality of strands of glass fibers.

4. A glass fiber bundle as defined in claim 3 wherein the strands forming the cord are twisted and plied together.

5. A glass fiber bundle as defined in claim 2 wherein the fiber bundle is in the form of a woven or non-woven fabric formed of cords of fibers.

6. In a glass fiber reinforced elastomeric product wherein elastomeric material constitutes a continuous phase in which the glass fibers are distributed, the improvement in the bonding relationship between the glass fiber surfaces of the elastomeric material comprising an anchoring agent selected from the group consisting of a silyl amide formed from an organo silicon compound selected from the group consisting of an organo silane containing one to three readily hydrolyzable groups and at least one organic group containing up to 12 carbon atoms and substituted by at least one amino group, with any remaining valences on the silicon atom being taken up by hydrogen and the corresponding silanols and siloxanes and an acid compound selected from the group consisting of aliphatic, cycloaliphatic and aromatic carboxylic acids containing five to 30 carbon atoms, their anhydrides and acid halides; a silyl amide formed of an amino silane containing one to three readily hydrolyzable groups and at least one organic group containing up to 12 carbon atoms and substituted by at least one amino group with any remaining valences on the silicon atom being taken up by hydrogen and a carboxy silane containing one to three readily hydrolyzable groups and at least one organic group containing up to 12 carbon atoms and substituted by at least one carboxy group, with any remaining valences on the silicon atom being taken up by hydrogen; a silyl amide formed from a carboxy compound selected from the group consisting of an organo silane containing one to three readily hydrolyzable groups and at least one organic group containing up to 12 carbon atoms and substituted by at least one carboxy group, with any remaining valences on the silicon atom being taken up by hydrogen, and the corresponding silanols and polysiloxanes and an amine compound selected from the group consisting of aliphatic and aromatic amines containing one to 20 carbon atoms.

7. A product as defined in claim 6 wherein the anchoring agent is present in the form of a thin coating on the individual glass fiber surfaces.

8. A product as defined in claim 6 wherein the anchoring agent is present as a thin film on the individual glass fiber surfaces and the glass fibers are in the form of bundles, said bundles having an elastomer compatible material as an impregnant therein.

9. A product as defined in claim 8 wherein the bundle is in the form of a cord formed of a plurality of strands of glass fibers.

10. A glass fiber bundle comprising a plurality of glass fibers, a thin coating on the individual glass fiber surfaces comprising an anchoring agent selected from the group consisting of (1) a silyl amide formed from an organo silicon compound selected from the group consisting of an organo silane containing one to three readily hydrolyzable groups and at least one organic group containing up to 12 carbon atoms and substituted by at least one amino group, with any remaining valences on the silicon atom being taken up by hydrogen and the corresponding silanols and siloxanes and an acid compound selected from the group consisting of aliphatic, cycloaliphatic and aromatic carboxylic acids containing five to 30 carbon atoms, their anhydrides and acid halides; (2) a silyl amide formed of an amino silane containing one to three readily hydrolyzable groups and at least one organic group containing up to 12 carbon atoms and substituted by at least one amino group with any remaining valences on the silicon atom being taken up by hydrogen and a carboxy silane containing one to three readily hydrolyzable groups and at least one organic group containing up to 12 carbon atoms and substituted by at least one carboxy group, with any remaining valences on the silicon atom being taken up by hydrogen; (3) a silyl amide formed from a carboxy compound selected from the group consisting of an organo silane containing one to three readily hydrolyzable groups and at least one organic group containing up to 12 carbon atoms and substituted by at least one carboxy group, with any remaining valences on the silicon atoms being taken up by hydrogen, and the corresponding silanols and polysiloxanes and an amine compound selected from the group consisting of aliphatic and aromatic amines containing one to 20 carbon atoms, and an elastomer compatible impregnant in the bundle.

11. A bundle as defined in claim 10 wherein the silyl amide is (1) and the organo silicon compound is a silane of the formula $$(H_2N - R_1 -)_n Si(R_2)_m Z_{(4-m-n)}$$

wherein $R_1$ is a divalent organic radical, $R_2$ is a monovalent organic radical or hydrogen, Z is a readily hydrolyzable group, $m$ is 0 or an integer from 1 to 2, and $n$ is an integer from 1 to 3.

12. A glass fiber bundle as defined in claim 11 wherein the acid compound is selected from the group consisting of a compound of the formula $$R_3-\overset{O}{\underset{\|}{C}}-OH$$

wherein $R_3$ is alkyl, alkenyl, cycloalkyl, aryl and N-heterocyclic groups, a compound of the formula $$HO-\overset{O}{\underset{\|}{C}}-R_4-\overset{O}{\underset{\|}{C}}-OH$$

wherein $R_4$ is alkylene, alkenylene, cycloalkylene, arylene and divalent N-heterocyclic groups, their corresponding acid halides and anhydrides.

13. A glass fiber bundle as defined in claim 10 wherein the coating also includes a film-forming binder, a lubricant or mixtures thereof.

14. A glass fiber bundle as defined in claim 10 wherein the silyl amide is (3) and the carboxy compound is a compound of the formula $$Z_{(4-p)} Si(-R_5-COOH)_p$$

wherein Z is a readily hydrolyzable group, $R_5$ is a divalent organic group and $p$ is an integer from 1 to 2.

15. A glass fiber bundle as defined in claim 14 wherein the amine compound is a compound of the formula $$H_2N - R_6 - NH_2$$

wherein $R_6$ is a divalent organic radical.

16. A glass fiber bundle as defined in claim 14 wherein the amine compound is a compound of the formula $$R_7 - NH_2$$

wherein $R_7$ is selected from the group consisting of alkyl, aryl, an N-heterocyclic group and an ester group of the formula $$R_8-O-\overset{O}{\underset{\|}{C}}-R_9$$

wherein $R_8$ is alkyl and $R_9$ is alkylene.

17. A glass fiber bundle as defined in claim 10 wherein the silyl amide is (2) and the amino silane has the formula $$(H_2N - R_1 -)_n Si(R_2)_m Z_{(4-n-m)}$$

wherein $R_1$ is a divalent organic radical, $R_2$ is a monovalent organic radical or hydrogen, Z is a readily hydrolyzable group, $m$ is 0 or an integer from 1 to 2 and $n$ is an integer from 1 to 3.

18. A glass fiber bundle as defined in claim 17 wherein the carboxy silane has the formula $$Z_{(4-p)} Si(-R_5-COOH)_p$$

wherein Z is a readily hydrolyzable group, $R_5$ is a divalent organic group and $p$ is an integer from 1 to 2.

19. A glass fiber bundle as defined in claim 10 wherein the bundle is in the form of a cord formed of a plurality of strands of glass fibers.

* * * * *